(12) United States Patent
Seeley et al.

(10) Patent No.: US 8,082,193 B2
(45) Date of Patent: Dec. 20, 2011

(54) MULTI-JURISDICTIONAL PAYROLL REQUIREMENTS

(75) Inventors: Antony J. W. Seeley, Redmond, WA (US); David I. Lindheimer, Mercer Island, WA (US); David J. Brankin, Redmond, WA (US); Evan D. Morgans, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 859 days.

(21) Appl. No.: 11/298,902

(22) Filed: Dec. 9, 2005

(65) Prior Publication Data

US 2007/0136156 A1    Jun. 14, 2007

(51) Int. Cl.
*G07F 19/00* (2006.01)
*G06F 17/60* (2006.01)

(52) U.S. Cl. .......................... 705/30; 705/40
(58) Field of Classification Search ................ None
See application file for complete search history.

(56) References Cited

U.S. PATENT DOCUMENTS

| | | | |
|---|---|---|---|
| 6,014,637 A | 1/2000 | Fell et al. | 705/26 |
| 6,041,312 A | 3/2000 | Bickerton et al. | 705/30 |
| 6,249,905 B1 | 6/2001 | Yoshida et al. | 717/1 |
| 6,401,079 B1 | 6/2002 | Kahn et al. | 705/30 |
| 6,411,938 B1 * | 6/2002 | Gates et al. | 705/30 |
| 2002/0022982 A1 * | 2/2002 | Cooperstone et al. | 705/7 |
| 2002/0184148 A1 * | 12/2002 | Kahn et al. | 705/40 |
| 2003/0065618 A1 | 4/2003 | VanDeBoe, Jr. | 705/40 |
| 2003/0236731 A1 | 12/2003 | Landaeta et al. | |
| 2004/0088256 A1 | 5/2004 | Klein et al. | |
| 2005/0129215 A1 | 6/2005 | Parker | 379/265.06 |
| 2005/0177477 A1 | 8/2005 | Arghavanifard et al. | 705/32 |
| 2006/0020545 A1 * | 1/2006 | Lindheimer et al. | 705/40 |

FOREIGN PATENT DOCUMENTS

| | | |
|---|---|---|
| KR | 1020040089307 A | 10/2004 |
| WO | 01/46875 A1 | 6/2001 |
| WO | WO 03/386693 A2 | 8/2003 |

OTHER PUBLICATIONS

Search Report and Written Opinion dated Apr. 16, 2007 from International application No. PCT/US2006/046560.
ADP TotalChoice Solutions, Maximize the HR dynamic, brochure, pp. 1-12, 2002.
ADP Internet Payroll, Handout Manual, pp. 1-30, 2000.
ADP TotalChoice Solutions Implementing TotalChoice, ITC-0803A, pp. 1-i through 1-4, 2-i through 2-10, 3-i through 3-12, 4-i through 4-22, 5-i through 5-30, 6-i through 6-16, 7-i through 7-26, 8-i through 9-8, 10-i through 10-14, 11-i through 11-14, at least by 2001.
ADP "Achieve Greater Success with the Right Solutions" presentation to American Payroll Associate, pp. 1-41, May 17, 2000.

(Continued)

*Primary Examiner* — Mussa Shaawat
(74) *Attorney, Agent, or Firm* — Westman, Champlin & Kelly, P.A.

(57) ABSTRACT

Payroll requirements are compiled from a plurality of jurisdictions. A plurality of payroll codes are cataloged that are required in one of the plurality of jurisdictions. A user representation includes the plurality of payroll codes. An implementation representation of calculating pay is formed. The implementation representation is based on the user representation and includes a plurality of elements. A specification for each element of the implementation representation is created.

12 Claims, 6 Drawing Sheets

OTHER PUBLICATIONS

"ADP Offers "Best of Both Worlds" to In-House Market With a New Hosted HRMS", http://www.investquest.com/iq/a/aud/ne/news/adphrms.htm, pp. 1-2 of 2, Aug. 30, 2002.

ADP TotalChoice Basic Pay Data Entry, Handout Manual, pp. 1-49, 2000.

ADP to Offer Corporate Pricing and Other Advantages to Wendy's International, Inc. Franchises for Employment Screening and Payroll Services, Press Release, p. 1 of 1, Oct. 23, 2002.

European Patent Application No. 06839098.8, Extended European Search Report dated Jul. 6, 2010. 2 pages.

Statement in Accordance with the Notice from the European Patent Office dated Oct. 1, 2007 concerning business method, dated Nov. 1, 2007 pp. 592-593.

ADP PC/Payroll Version 4.5, Getting Started Guide, pp. i-xii and 1-60, 2002.

ADP PC/Payrol Version 4.5, User's Guide, pp. i-xvi and 1-70, 2002.

ADP Enterprise HRMS, Company and Employee Maintenance Guide, pp. iii through xxxiii, 1-2 through 1-7, 2-2 through 2-101, 3-2 through 3-29, 4-2 through 4-51, 5-2 through 5-9, 6-2 through 6-40, 7-2 through 7-24, 8-2 through 8-18, 9-2 through 9-16, 10-2 through 10-16, 11-2 through 11-60, 12-2 through 12-60, 13-2 through 3-13, 2004.

Claim Chart for U.S. Appl. No. 11/298,902 (US 2007-013656), pp. 1-10.

Chinese Patent Application No. 200680045944.4 First Office Action Date of Dispatch Feb. 16, 2011, 10 pages.

Agarwal et al., R., "Comprehending Object and Process Models: An Empirical Study", IEEE Transactions on Software Engineering, vol. 25, No. 4, pp. 541-556, Jul./Aug. 1999.

Thieke, W., "Payroll Made Easy: Developing a Web Based System for Student Employee Payroll", SIGUCCS (Special Interest Group on University and College Computing Services) 2000, pp. 298-302, Oct. 29-Nov. 1, 2000.

Jahnke et al., B., "Business Process Reengineering and Software Systems Strategy", Arbeitsberichte zur Wirtschaftsinformatik, Band 11, 1994.

* cited by examiner

MULTI-JURISDICTIONAL PAYROLL REQUIREMENTS

BACKGROUND

Payroll is a process with which employers, accountants and payroll agencies determine and distribute wages to an employee as well as handle vacation and sick time accumulation. The payroll process takes into account certain taxable payments, such as salary, bonuses, advance payments and overtime, and non-taxable payments, such as employee expenses and employer pension contributions. The payroll process also takes into account certain pre-tax deductions and post-tax deductions, such as employee pension contributions and health care costs. Furthermore, the payroll process also takes into account certain benefits, credits and charges. Due to the complexity of calculating wages, withholdings and credits for employees, many employers, accountants and payroll agencies use a third party calculation system or application software to prepare the payroll for the company.

Payroll calculation systems provide automated payroll solutions for calculating an employee's net pay. Calculating an employee's net pay differs from jurisdiction to jurisdiction and geography to geography (e.g. country to country, state to state, city to city and etc.). The differences in calculating net pay in different jurisdictions includes elements of employee income subject to various taxes or deductions, the calculation of tax and deductions as well as the sequence of applying taxes and deductions. The complexity and variance of these payroll requirements in different jurisdictions makes generically calculating pay across many jurisdictions very challenging.

Although the overall intent of calculating pay across different jurisdictions is the same, determining an employee's net pay and an employer's expenses and liabilities based on the legislative rules that govern different jurisdictions is widely varied. Many of the legislative rules employed in one jurisdiction can also be employed in other jurisdictions. However, many legislative rules in one jurisdiction can not be found in other jurisdictions. Finding a structured way to compile payroll requirement across multiple jurisdictions would be beneficial to a payroll calculation system.

The discussion above is merely provided for general background information and is not intended to be used as an aid in determining the scope of the claimed subject matter.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

Payroll calculation requirements are compiled using a structured analysis and representation. The payroll calculation requirements are decomposed into a series of elements that have specified inter-relationships. A structured specification is created from the structured representation of elements of payroll calculation requirements. The structured specification can be used for implementing computer-readable instructions in a payroll processing engine of a payroll system. The computer-readable instructions in the payroll processing engine calculate pay for at least one employee.

BRIEF DESCRIPTION OF THE DRAWINGS

FIG. 2 is a simplified block diagram of a payroll system.

DETAILED DESCRIPTION

Some payroll calculation systems can include a client application. In such payroll calculation systems, the client application calculates employee net pay using a payroll processing engine. Other payroll calculation systems include a service application and a client application. In such payroll calculation systems, the service application calculates employee net pay using a payroll processing engine. After calculations of net pay are calculated by the payroll processing engine in the later example, the results are passed to the client application. Calculations made by the payroll processing engine need to consider the calculation of pay of a plurality of different jurisdictions for which the employee is paid. Before describing the payroll processing engine and a structured way of handling jurisdiction specific payroll requirements, one embodiment of an illustrative environment in which the payroll calculation system can be used is described.

Figure 1:
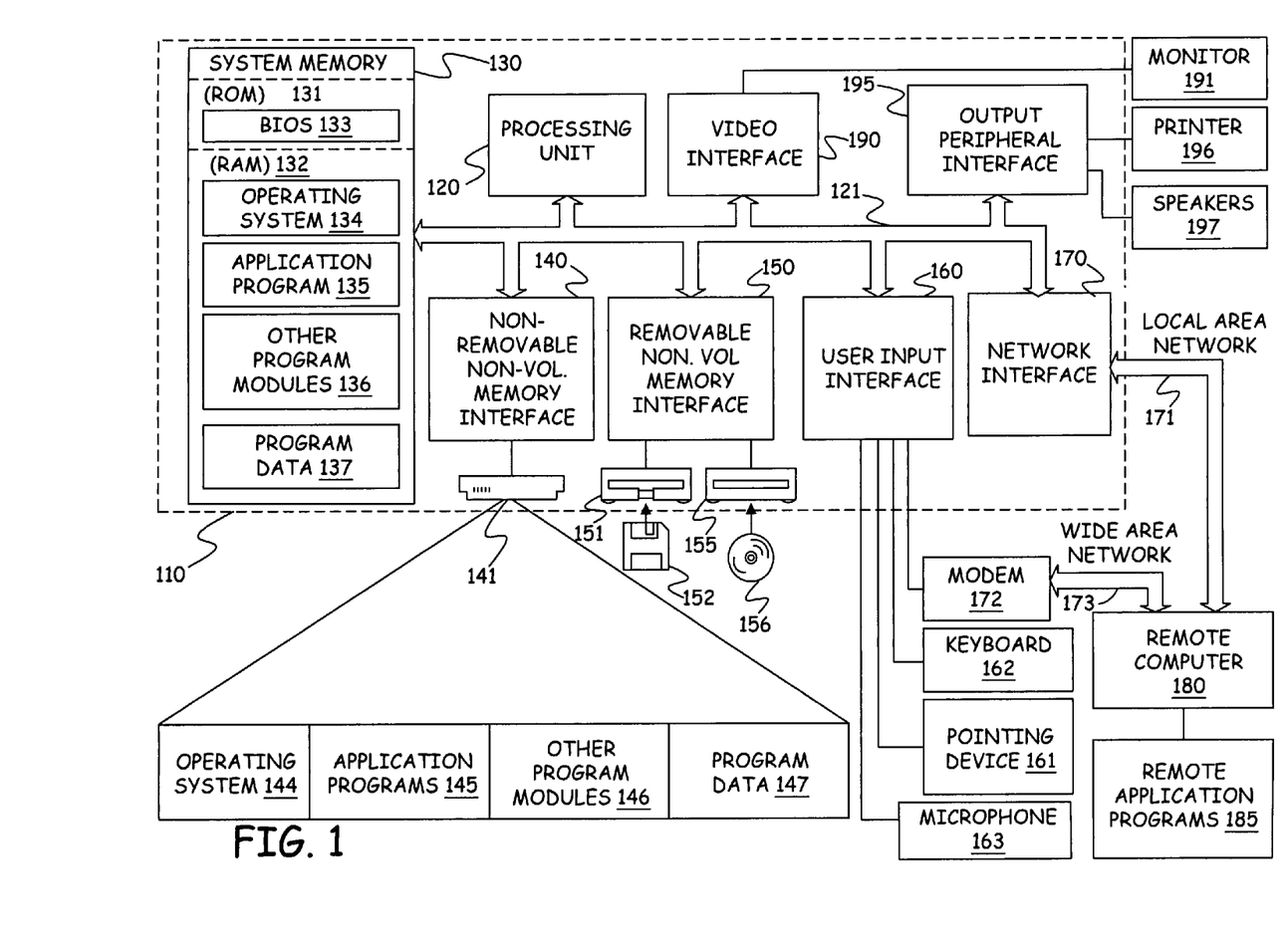
FIG. 1 is a block diagram of one computing environment in which some embodiments may be practiced.

FIG. 1 illustrates an example of a suitable computing system environment 100 on which embodiments may be implemented. The computing system environment 100 is only one example of a suitable computing environment and is not intended to suggest any limitation as to the scope of use or functionality of the claimed subject matter. Neither should the computing environment 100 be interpreted as having any dependency or requirement relating to any one or combination of components illustrated in the exemplary operating environment 100.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing some embodiments includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 21:
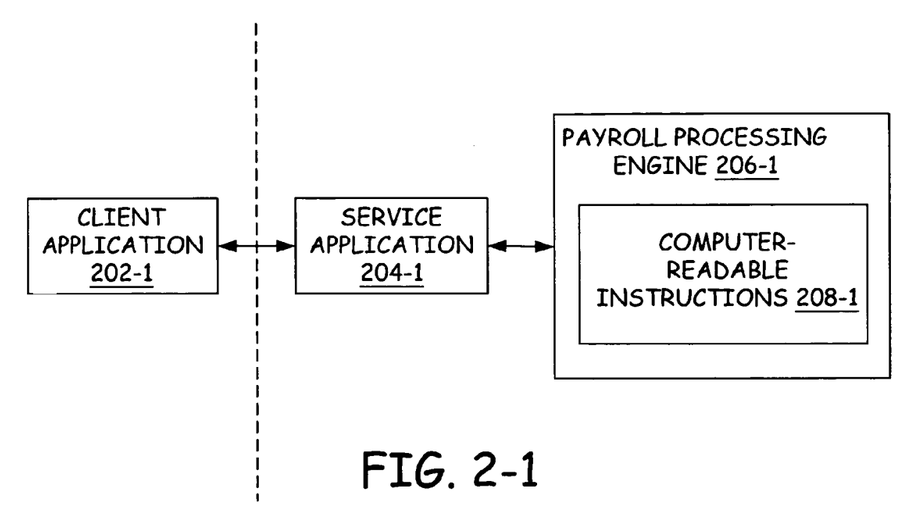

FIG. 2-1 illustrates a simplified schematic diagram of one embodiment of a payroll system 200-1. Payroll system 200-1 includes a client application 202-1, a service application 204-1 located remotely from the client application and a payroll processing engine 206-1. In general, client application 202-1 is installed at a company's local. The client application 202-1 passes information to a service application 204-1 so that the company can subscribe to payroll calculation services over an network, such as the Internet. The service application 204-1 uses payroll processing engine 206-1 to calculate all pre-tax calculations, tax calculations and post tax calculations to determine an employee net pay. When the payroll calculations are complete, the results are passed back to the client application 202-1 for presentation to a user.

Figure 22:
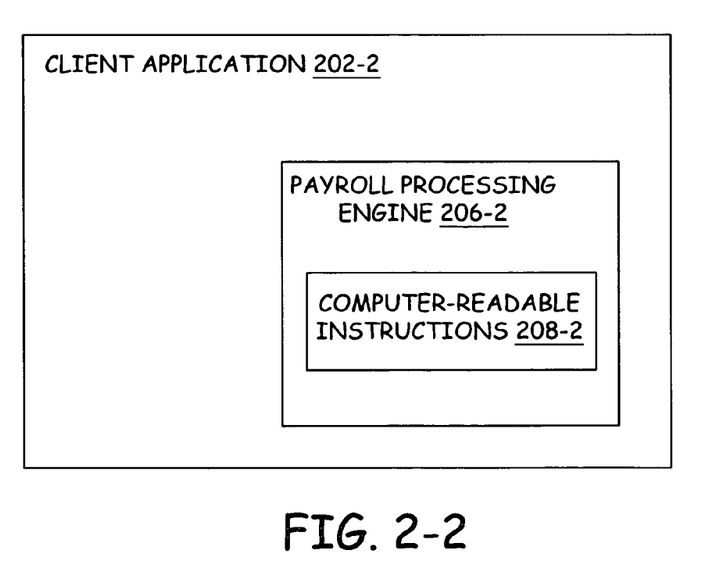

FIG. 2-2 illustrates a simplified schematic diagram of one embodiment of a payroll system 200-2. Payroll system 200-2 includes a client application 202-2. Client application 202-2 includes a payroll processing engine 206-2. Payroll processing engine 206-2 calculates all pre-tax calculations and post-tax calculations to determine an employee net pay.

Payroll processing engines 206-1 and 206-2 include computer-readable instructions 208-1 and 208-2, respectively. Computer-readable instructions 208-1 and 208-2 instruct payroll processing engine 206-1 and 206-2 on how to calculate net pay for a particular pay period of at least one employee. Computer-readable instructions 208-1 and 208-2 are jurisdiction-specific depending on what jurisdiction(s) are paying the employee. For example, different jurisdictions can include different countries, different locals (i.e. different states within the same country) and different geographies. Each jurisdiction includes specific payroll requirements that are typically very complex. These specific payroll requirements are included in computer-readable instructions 208-1 and 208-2 and need to be used by payroll processing engine 206-1 and 206-2 to calculate pay. Compiling jurisdiction-specific payroll requirements is a difficult and tedious process and needs to be handled in a structured way such that multiple jurisdictions can be gathered in an organized and manageable manner.

Figure 3:
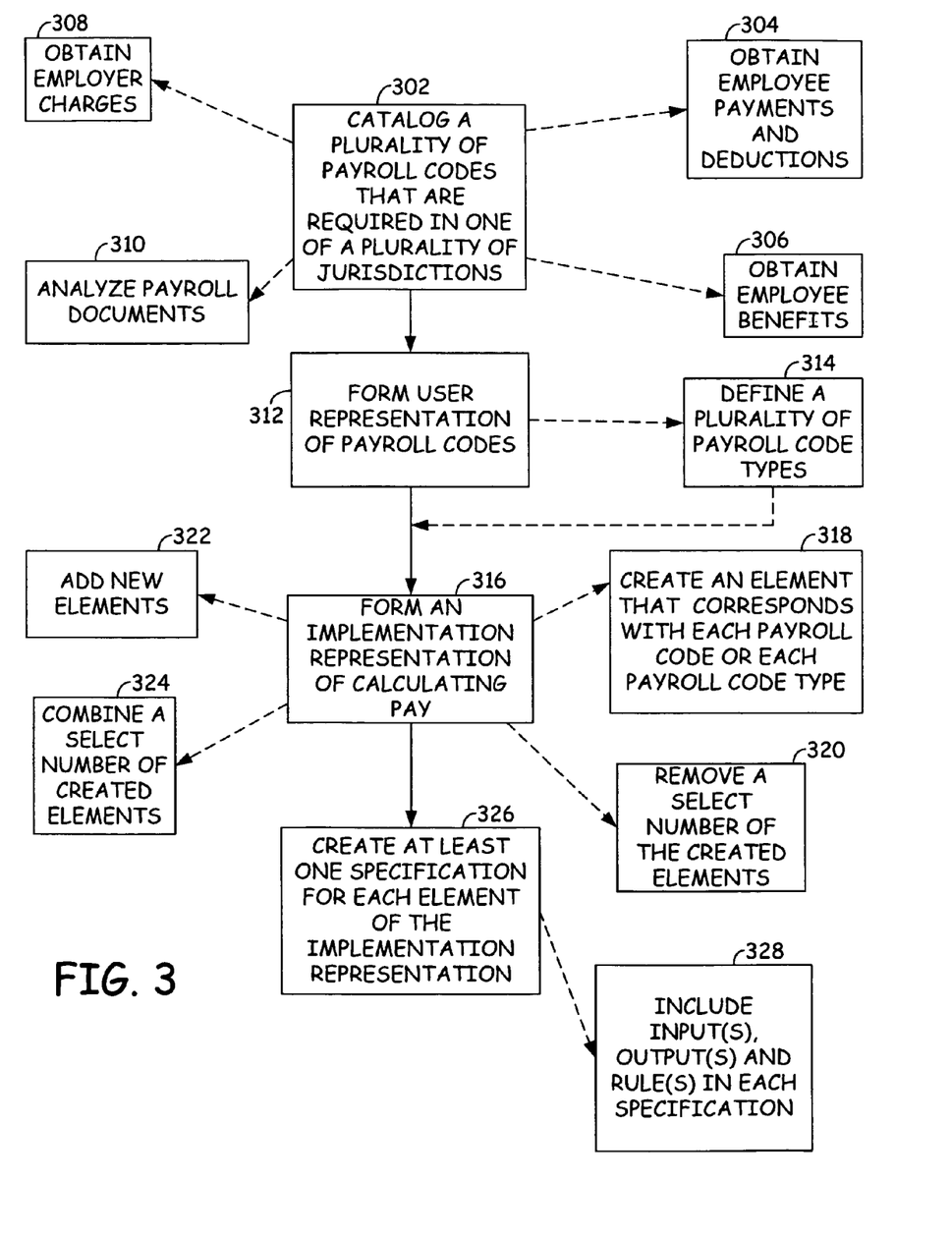
FIG. 3 is a flowchart illustrating a method of compiling payroll requirements in a plurality of jurisdictions.

FIG. 3 illustrates a flowchart 300 showing a method of compiling payroll requirements from a plurality of jurisdictions. The method begins at block 302 where a plurality of payroll codes that are required in one of the plurality of jurisdictions are cataloged. Example payroll codes include payments, deductions, benefits and employer charges. At block 304, cataloging payroll codes includes obtaining payments. Payments include ways in which an employee is compensated. Example payments include salary, hourly wage, overtime pay, back pay, advance pay, bonuses and commission. This is not an exhaustive list of types of payments. This list of payments are exemplary. At block 304, cataloging payroll codes also includes obtaining deductions. Deductions include ways in which an employee's compensations are deducted. Example deductions include income tax (including federal, state and local) and social security. This is not an exhaustive list of types of deductions. This list of deductions are exemplary. At block 306, cataloging payroll codes includes obtaining employee benefits. Employee benefits include ways in which an employee's compensation is additionally deducted. Benefits can be applied either post-tax or pre-tax. Example employee benefits include employer pension contributions and health insurance contributions. This is not an exhaustive list of types of benefits. The list of benefits are exemplary. It should be noted that not all jurisdictions include benefit contributions.

At block 308, cataloging payroll codes includes obtaining employer charges. Charges are additional costs to an employer for employing an employee. Example charges include employer pension contributions, employer health insurance contributions and additional social security charges. This is not an exhaustive list of types of charges. The list of charges are exemplary. In addition, payroll codes can also include employer charges that can be recovered or recouped from the governing body of a particular jurisdiction (i.e. employer legislative required reporting payments).

To catalog payroll codes, information related to payments, deductions, benefits and charges can be obtained by analyzing and gleaning information from payroll documents within each jurisdiction as illustrated at block 310. There are many ways to analyze payroll documents to obtain information. Information can be obtained by using existing employee payslips. The more payslips that are reviewed, the better chance that a payroll code can be identified. In addition, information can be obtained by reviewing legislative documentation and employment law documentation.

Figure 4:
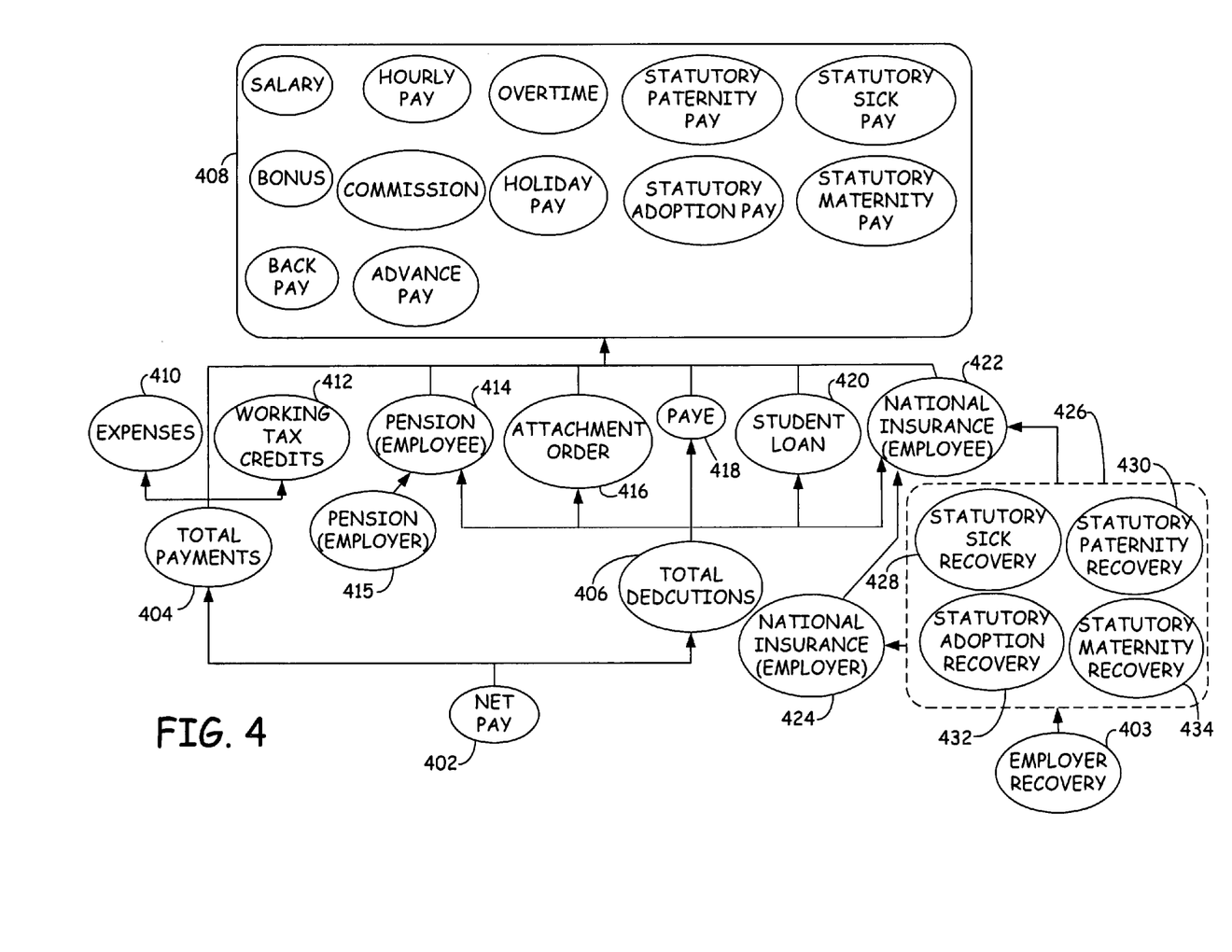
FIG. 4 illustrates an exemplary user representation of payroll requirements.
Figure 5:
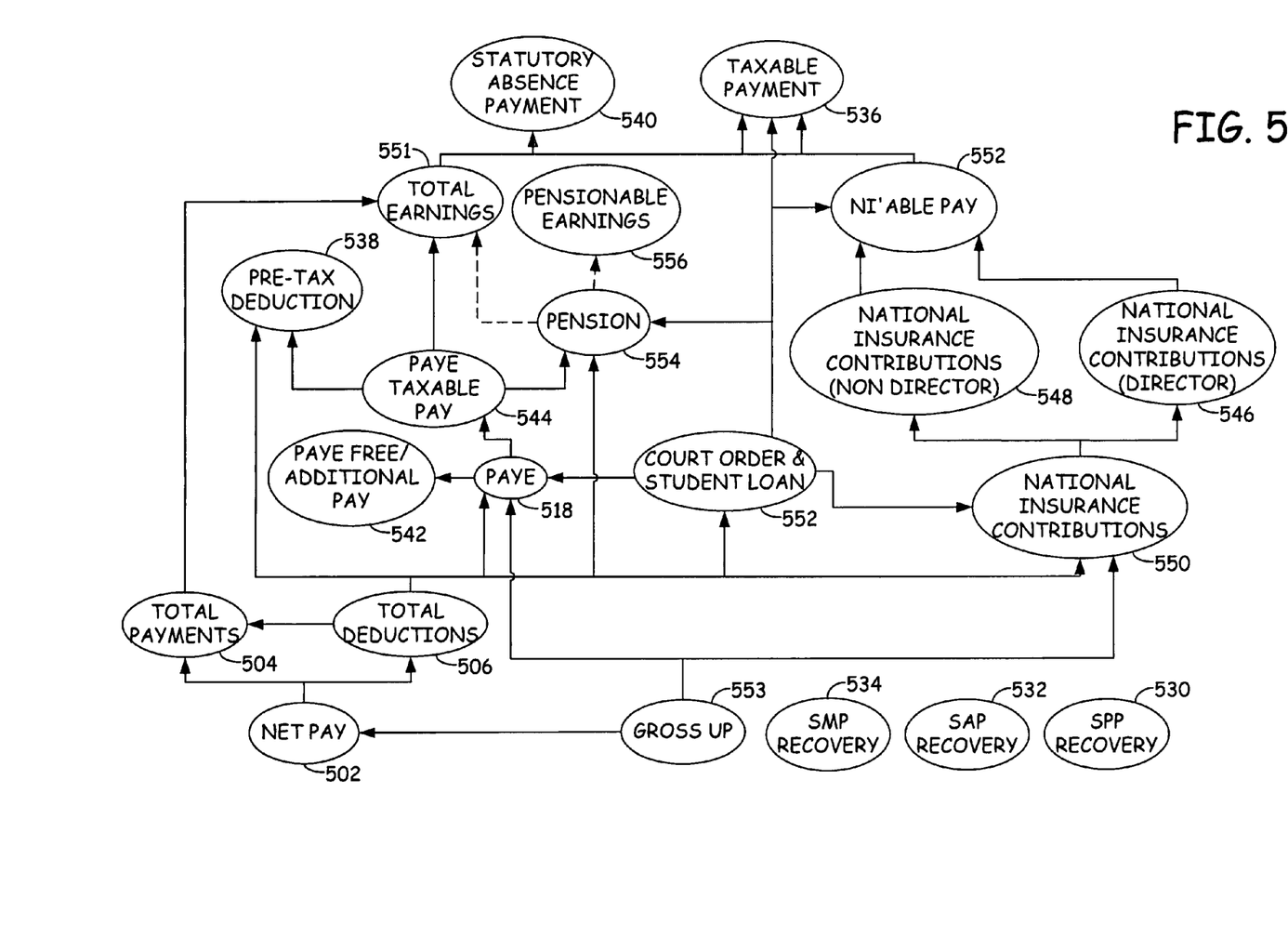
FIG. 5 illustrates an exemplary implementation representation of payroll requirements.

After the plurality of payroll codes are cataloged, a user representation or payroll code dependency diagram is formed at block 312. The user representation includes the payroll codes cataloged in block 302. A user representation or payroll code dependency diagram includes a plurality of payroll codes and illustrates how the payroll codes interrelate. FIGS. 4 and 5 illustrate an example user representation or payroll code dependency diagram 400 and an example implementation representation or payroll element dependency diagram 500 for a United Kingdom jurisdiction. It should be noted that FIGS. 4 and 5 are used as examples for describing embodiments related to the United Kingdom jurisdiction. However, it should be recognized that the following described embodiments pertain to all different types of jurisdictions.

The arrows in user representation or payroll code dependency diagram 400 illustrate the relationships between each payroll code. A payroll code is dependent on the result of the payroll code(s) that it points to. Block 402, for example, illustrates net pay. Net pay code 402 is the ultimate calculation of the user representation. The determination of net pay is based on total payments code illustrated at block 404 and total deductions code illustrated at block 406. Total payments code 404 includes all taxable payments as well as non-taxable payments. The determination of total payments code 404 is based on sources of payments in the jurisdiction of the United Kingdom (all grouped together in block 408), expenses code illustrated at block 410 and working tax credits code illustrated in block 412. Payment payroll codes in block 408 include salary, bonus, back pay, hourly pay, commission, advance pay, overtime, holiday pay, statutory paternity pay, statutory adoption pay, statutory sick pay and statutory maternity pay.

The determination of total deductions code 406 is based on various deduction codes illustrated in blocks 414, 416, 418, 420 and 422. For purposes of the user representation or payroll code dependency diagram 400, identifying whether these deductions are pre-tax or post-tax is unnecessary. The user representation only cares that these blocks are deductions. Block 414 is a code representing pension contributions by the employee. It should be noted that the code for pension contributions by an employer (illustrated in block 415) are often based on the pension contributions of the employee. For example, an employer may decide to match the percentage of salary that the employee is contributing to a pension up to a certain percentage. Block 415 indicates to a user that the employer is contributing to the employee's pension. However, the employer contributions need not be known to calculate the employee's net pay 402. Block 416 includes attachment order codes, which are garnishments that can be deducted. These garnishments relate to payments that need to be paid to a governing body for one reason or another. For example, a common garnishment in the United Kingdom is child support. Block 418 includes the tax that applies to the particular employee's pay. In the United Kingdom, the income tax is called Pay As You Earn (PAYE). Block 420 includes a student loan code that can be deducted. Block 422 includes an employee National Insurance code. The United Kingdom National Insurance is a type of social security. National Insurance contributions made by an employee are also correspondingly made by an employer as illustrated in block 424. Employer contributions to National Insurance on behalf of the employee need not be known to calculate net pay code 402.

However, an employer contribution to National Insurance is relevant for purposes of calculating an employer recovery, as illustrated at block 403. The determination of employer recovery 403 is based on employer recovery of statutory absence pay that are grouped together in block 426. Types of statutory absence pay that can be recovered includes statutory sick recovery code 428, statutory paternity recovery 430, statutory adoption recovery code 432 and statutory maternity recovery code 434. As illustrated in the user representation or payroll code dependency diagram 400, employer contributions to National Insurance as well as employee contribution to National Insurance are based on employer recovery of statutory absence pay grouped together in block 426.

After forming the user representation or payroll code dependency diagram in block 312, the method can proceed to block 314 and define a plurality of payroll code types. Each payroll code type corresponds with a treatment category. Payroll code types can include two different categories: types that can be used in user definable payroll codes and types that can be assigned to an implementation definable payroll codes. Example user definable payroll code types for the United Kingdom include taxable payments, non-taxable payments, pre-tax deductions, post-tax deductions. Example implementation definable payroll code types for the United Kingdom include statutory absence payments, pension and legislative. These example payroll code types are exemplary for the jurisdiction of the United Kingdom. Other payroll code types can used in other jurisdictions as well as in the United Kingdom. A user can define a payroll code type with a user definable payroll code type such that a payroll processing engine can treat a payroll code type differently from other payroll code types.

At block 316, an implementation representation or payroll element dependency diagram is formed. The implementation representation includes a plurality of interrelated elements. Each element has an associated rule or can share rules with other elements and includes a result of the rule once it is calculated. An implementation representation or payroll element dependency diagram is based on the user implementation or payroll code dependency diagram and illustrates how net pay is to be calculated by a payroll processing engine, such as payroll processing engine 206.

FIG. 5 illustrates the example implementation representation or payroll element dependency diagram 500 for the United Kingdom jurisdiction. Like user representation 400, the arrows in implementation representation or payroll element dependency diagram 500 illustrate the relationships between each element. As illustrated, an element is dependent on the element(s) that it points to. At block 318 of FIG. 3, forming an implementation representation can include creating an element that corresponds with each payroll code or payroll code type in the user representation. For example, in implementation representation 500, a net pay element 502 corresponds with net pay code 402 of the user representation 400. Furthermore, a total payments element 504 and a total deductions element 506 correspond with total payments code 404 and total deductions code 406 of FIG. 4. Still further, as defined in block 314, user definable payroll code type taxable payments corresponds with a taxable payment element 536, user definable payroll code type pre-tax deductions corresponds with a pre-tax deduction element 538 and implementation definable payroll code type statutory absence corresponds with a statutory absence payment element 540. Taxable payment element 536 represents all payments which are taxable. Pre-tax deduction element 538 represents all deductions that are deducted prior to applying a tax. Statutory absence payment element 540 represents all statutory pay from statutory paternity pay, statutory sick pay, statutory adoption pay and statutory maternity pay. These are not an exhaustive list. Other types of pay are possible. Still further, a statutory maternity pay recovery element 534 corresponds with statutory maternity recovery code 434, a statutory adoption pay recovery element 532 corresponds with statutory adoption recovery code 432 and a statutory paternity pay recovery element 530 corresponds with statutory paternity recovery code 430. Statutory maternity pay recovery element 534 enables employers to recover some of their statutory maternity payments. Statutory adoption pay recovery element 532 enables an employer to recover some of their statutory adoption payments. Statutory paternity pay recovery element 530 enables employers to recover some of their statutory paternity payments.

At block 320 of FIG. 3, forming an implementation representation can also include removing a select number of the plurality of elements that were initially created to correspond with each payroll code and each payroll code type. The select number of elements removed are those elements that do not include an associated rule. For example, the payment payroll codes grouped in block 408 of user representation 400 do not have an associated rule. These payment payroll codes, such as salary, bonus, back pay and etc., are values provided by a client application, such as client application 202-1 or 202-2, to a payroll processing engine, such as payroll processing engine 206-1 or 206-2. A taxable payment rule is applied to the supplied payroll codes and the result is written to a taxable payment element 536. Therefore, a single element 536 represents the total of payroll codes in block 408.

At block 322, a select number of elements can be added to the implementation representation when a single payroll code includes multiple fnctionalities. For example, PAYE code 418 has a plurality of functionalities. Therefore, in implementation representation 500, additional elements are added. These elements include a PAYE element 518, a PAYE free/additional pay element 542 and a PAYE taxable pay element 544. PAYE element 518 calculates an employee's payroll related period income tax. PAYE free/additional pay element 542 includes an employee's free or additional pay. Free pay is deducted from an employee's taxable pay and additional pay is added to an employee's taxable pay. PAYE taxable pay element 544 includes an employee's total earnings but not an employee's free pay or additional pay. In another example, employee National Insurance code 422 has a plurality of functionalities. Therefore, in implementation representation 500, additional elements are added. These elements include a NI'able pay element 552 (i.e. a portion of an employee's total earnings that are subject to National Insurance), a National Insurance-director element 546 (i.e. employee contribution if you are a director), a National Insurance-non-director element 548 (i.e employee contribution if you are a non-director)

and a National Insurance Contributions element 550 (i.e. determines the correct National Insurance element to be used on an employee).

In addition, a select number of elements can be added to the implementation representation to simplify calculations. In one example a total earnings element 551 is added to implementation representation 500 to simplify what total payments are subject to tax. Elements that correspond with expenses code 410 and working tax credit code 412 were also combined to form total earnings element 551. In another example, a gross up element 553 is added to implementation representation 500 to repeatedly calculate an unknown gross earnings element value and executes a gross to net calculation until the calculated net value is within a specified level of accuracy to a given desired amount.

At block 324, a select number of elements can be combined if two or more of the elements includes a common functionality. For example, attachment order code 416 and student loan code 420 have common functionalities. Therefore, in implementation representation 500, these elements are combined to form a court order and student loan element 552. Court order and student loan element 552 requires an employer to deduct fines that an employee owes and deduct student loan payments.

In other embodiments, an element can be combined with another element and in addition an element can be added if the combined element has more than one functionality. For example, the payroll code employee pension contributions and employer pension contributions have common functionalities. Therefore, in implementation representation 500, these elements are combined to form the element pension. However, a pension element 554 can have more than one functionality. In such an embodiment, an element pensionable earning element 556 is added. Pensionable earnings element 556 calculates an employee's pensionalble earnings. Pension 554 defines both the employer's contributions to pension and the employee's contributions to pension.

At block 326 of FIG. 3, a specification is created for each element of the implementation representation. Each specification includes various types of information related to the element. For example, a specification can include a description of the functions of the element, attributes of the element, tax treatment of the element, input(s) for the element and output(s) for the element. The input(s) of an element can be other elements shown in the implementation representation. In addition, example inputs include employee attributes specific to the employee for which pay is being calculated (e.g. date of birth), company attributes specific to the employer who is paying the employee, payroll codes and legislative values (e.g. tax tables, pension caps and etc.). The output(s) of an element, but not by limitation, can be input(s) to other elements. A specification can also include rules for manipulating the input(s) to find the output(s) as well as definitions, assumptions, formulas and legislative updates. Output(s) for the element are at least partially based on the input(s) of the element and the rule(s) of the element. The arrows in the example implementation representation 500 illustrated in FIG. 5 point to the various input(s) and output(s) of each element. The following is a brief description of the relationships between an element and its corresponding input(s) and output(s).

Taxable payment element 536 and statutory absence payment element 540 are inputs for the output of total earnings element 551 and NI'able pay element 552. Total earnings element 551 is an input for the output total payments element 504. Total earnings element 551, pre-tax deductions element 538 and pension element 554 are all inputs for the output PAYE taxable pay element 544. Total earnings element 551 and pensionable earnings element 556 are optional inputs for the output pension element 554. PAYE taxable pay element 544 and PAYE free/additional pay element 542 are inputs for the output PAYE element 518. Pre-tax deduction element 538, PAYE element 518, pension element 554, court order and student loan element 552 and National Insurance contributions element 550 are inputs for the output total deductions element 506. Taxable payments element 536, pension element 554 and NI'able pay element 552 are inputs for the output court order and student loan element 552. National Insurance-non-director element 548 and National Insurance-director element 546 are possible inputs for the output National Insurance contributions element 550. NI'able pay element 552 is an input for both of the outputs National Insurance-non-director element 548 and National Insurance-director element 546. Taxable payment element 536 and statutory absence payment element 540 are inputs for the output NI'able pay element 552. Total payments element 504 and total deductions element 506 are inputs for the output net pay element 502. PAYE 518, National Insurance contributions element 550 and net pay element 502 are inputs for the output gross up element 553.

Figure 6:
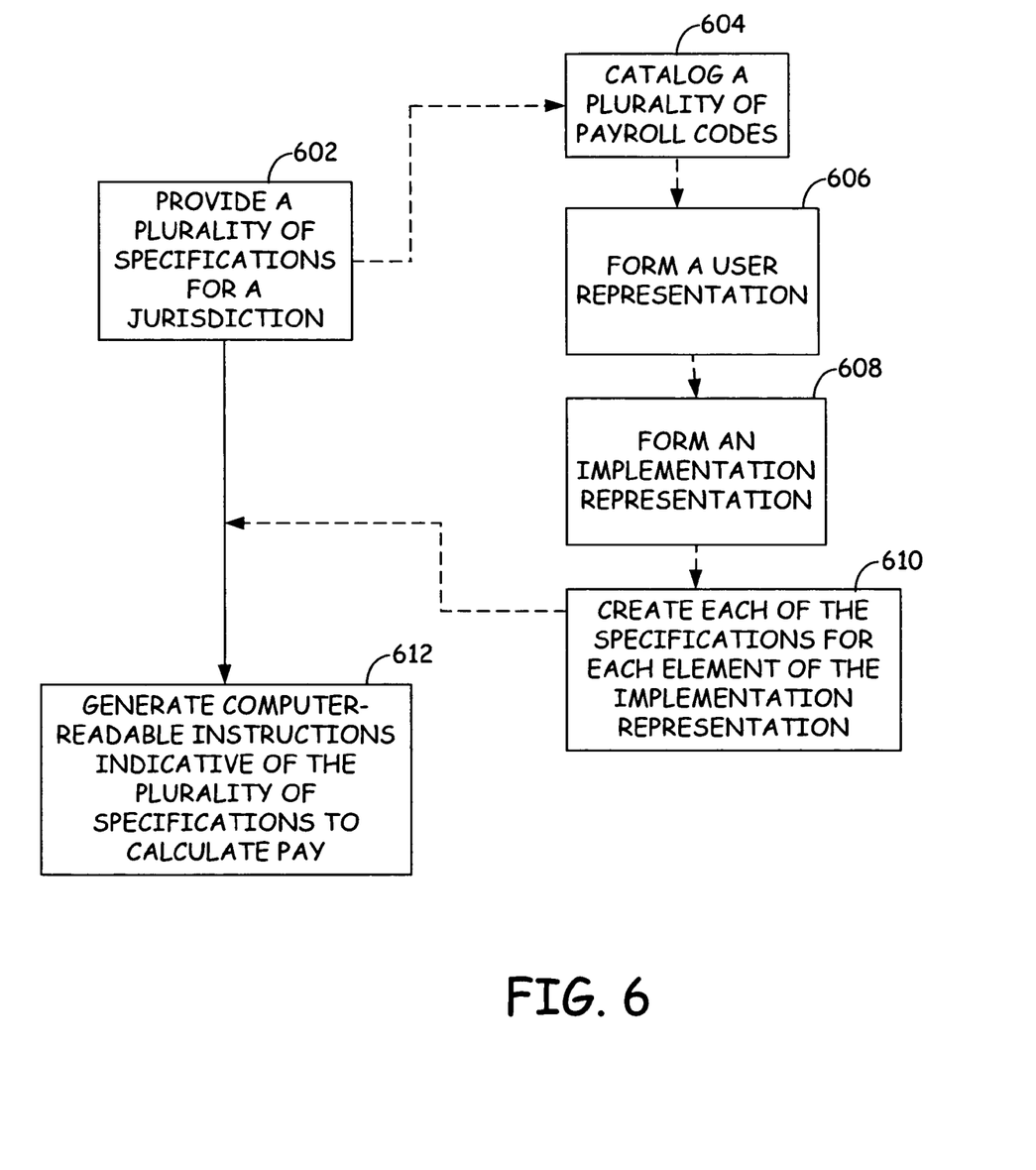
FIG. 6 is a flowchart illustrating a method of creating a payroll processing engine.

FIG. 6 illustrates a flowchart 600 showing a method of creating a payroll processing engine for use in calculating pay. At block 602, a plurality of specifications for a jurisdiction are provided. Each specification includes information, such as input(s), output(s) and rule(s), for each element. The output(s) of each element are at least partially based on the input(s) and rule(s) of each element. To provide the plurality of specifications for a jurisdiction, at block 604, a plurality of requirements or payroll codes are cataloged in at least one of a plurality of jurisdictions as previously discussed in FIG. 3. At block 606, a user representation of the cataloged payroll codes are formed as previously discussed in FIGS. 3 and 4. At block 608, an implementation representation for calculating pay is formed that is based on the user representation as previously discussed in FIGS. 3 and 5. The implementation representation includes a plurality of elements. At block 612, computer-readable instructions indicative of the plurality of specifications are generated to calculate pay.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of compiling payroll requirements, the method comprising:

cataloging, by using a processor, a plurality of payroll codes that are required in one of a plurality of jurisdictions, the payroll codes being indicative of data types needed to calculate pay;

forming, by using the processor, a user representation illustrating only the cataloged plurality of payroll codes and how each of the payroll codes interrelate to each other for a select one of the plurality of jurisdictions, wherein each payroll code in the user representation is dependent on the result of the payroll code or payroll codes to which the payroll code directly points;

forming, by using the processor, an implementation representation from the user representation illustrating rules for how a payroll processing engine will calculate pay for the select jurisdiction by:

creating an element for each payroll code in the user representation;

assigning, to each element, at least one rule or functionality for treating the payroll code the element represents and a type of result when the rule or functionality is applied;

removing a select number of elements that only represent values and do not have an associated rule or functionality:
adding multiple elements for those elements representing payroll codes with a plurality of rules or functionalities:
combining at least two elements if the payroll codes the elements represent have a common rule or functionality: and
producing, using the processor, a specification for each element of the implementation representation that is stored in computer-readable instructions to allow the payroll processing engine to calculate pay for the select jurisdiction.

2. The method of claim 1, wherein the payroll codes that are indicative of types of data needed to calculate pay comprise employee payments and deductions for the select jurisdiction.

3. The method of claim 1, wherein the payroll codes that are indicative of types of data needed to calculate pay comprise employee benefits for the select jurisdiction.

4. The method of claim 1, wherein the payroll codes that are indicative of types of data needed to calculate pay comprise employer charges and employer legislative required reporting payments for the select jurisdiction.

5. The method of claim 1, wherein the specification for each element of the implementation representation comprises information including input(s), output(s) and rule(s), wherein the output(s) are at least partially based on the input(s) and the rule(s).

6. A method of creating a payroll processing engine for use in calculating pay, the method comprising:
cataloging, using a processor, a plurality of payroll codes that are required in a jurisdiction by obtaining information from at least one of existing jurisdiction-specific employee pay slips, jurisdiction-specific legislative documents and jurisdiction-specific employment law documents, the payroll codes being indicative of data types needed to calculate pay;
forming, using the processor, a user representation illustrating only the cataloged plurality of payroll codes to and how each of the interrelate to each other payroll codes for the jurisdiction, wherein each payroll codes in the user representation is dependent on the result of the payroll code or payroll codes to which the payroll codes directly points;
forming, by using the processor, an implementation representation from the user representation illustrating rules for how the payroll processing engine will calculate pay for the jurisdiction by:
creating an element for each payroll code in the user representation;
assigning, to each element, at least one rule or functionality for treating the payroll code the element represents and a type of result when the rule or functionality is applied;
removing a select number of elements that only represents values and do not have an associated rule or functionality;
adding multiple elements for those elements representing payroll codes with a plurality of rule or functionalities;
combining at least two elements if the payroll codes the elements represent have a common rule or functionality;
producing, using the processor, a specification for each element of the implementation representation, each specification including information related to each element in the implementation representation; and
generating, using the processor, computer-readable instructions indicative of the plurality of specifications to allow the payroll processing engine to calculate pay for the jurisdiction.

7. A payroll system comprising:
a processor configured to implement a payroll processing engine that includes computer readable instructions for calculating pay, wherein the computer-readable instructions comprise a plurality of specifications indicative of specific payroll requirements for a jurisdiction, wherein each of the plurality of specifications are created by:
cataloging a plurality of payroll codes that are required in the jurisdiction, the payroll codes being indicative of data types needed to calculate pay;
forming a user representation illustrating only the cataloged plurality of payroll codes and how the payroll codes interrelate to each other for the jurisdiction, wherein each payroll codes in the user representation is dependent on the result of the payroll code or payroll codes to which the payroll code directly points;
forming an implementation representation from the user representation illustrating rules for how the payroll processing engine will calculate pay for the jurisdiction by:
creating an element for each payroll code in the user representation;
assigning, to each element, at least one rule or functionality for treating the payroll code the element represents and a type of result when the rule or functionality is applied:
removing a select number of elements that only represent values and do not have an associated rule or functionality;
adding multiple elements for those elements representing payroll codes with a plurality of rules or functionalities;
combining at least two elements if each payroll code the elements represent have a common rule or functionality; and
wherein one of the plurality of specifications is generated for each element of the implementation representation to allow the payroll processing engine to calculate pay.

8. The payroll system of claim 7, wherein each specification includes information indicative of input(s), output(s) and rule(s), wherein the output(s) are at least partially based on the input(s) and the rule(s).

9. The payroll system of claim 8, wherein the processor performs a step of calculating the output(s) of each specification at least partially based on the input(s) and the rule(s).

10. The payroll system of claim 7, wherein the processor performs a step of calculating pay based at least partially on the output(s) of each specification.

11. The payroll system of claim 7, wherein the processor that implements the payroll processing engine including the computer-readable instructions that have the created specifications is located in a client application.

12. The payroll system of claim 7, wherein the processor that implements the payroll processing engine including the computer-readable instructions that have the created specification is located remotely from the client application and coupled to a service application.

* * * * *